United States Patent [19]

Johnston

[11] Patent Number: 4,617,680

[45] Date of Patent: Oct. 14, 1986

[54] DEAD TIME COMPENSATION CIRCUIT FOR RADIATION DETECTOR

[75] Inventor: Joseph G. Johnston, Newbury, Ohio

[73] Assignee: Bicron Corporation, Newbury, Ohio

[21] Appl. No.: 564,298

[22] Filed: Dec. 22, 1983

[51] Int. Cl.[4] .................. G01T 1/18; G06M 11/00
[52] U.S. Cl. ........................... 377/10; 377/28; 250/374; 250/388
[58] Field of Search ............ 377/28, 10; 328/129.1; 307/590, 597, 493, 494, 491, 490; 250/374, 388, 336.1

[56] References Cited

U.S. PATENT DOCUMENTS

| | | | |
|---|---|---|---|
| 3,366,791 | 1/1968 | Markow | 250/83.6 |
| 3,576,995 | 5/1971 | Nirschl et al. | 250/388 |
| 3,814,937 | 6/1974 | Lowes | 250/336 |
| 3,959,653 | 5/1976 | Lee et al. | 250/374 |
| 3,984,690 | 10/1976 | Marshall, III et al. | 250/374 |
| 4,090,082 | 5/1978 | Marshall, III | 328/129.1 |
| 4,292,539 | 9/1981 | Todd | 250/374 |
| 4,311,909 | 1/1982 | Utting et al. | 250/374 |
| 4,423,329 | 12/1983 | Garcia et al. | 250/374 |

Primary Examiner—John S. Heyman
Assistant Examiner—Karl Ohralik
Attorney, Agent, or Firm—Pearne, Gordon, Sessions, McCoy, Granger & Tilberry

[57] ABSTRACT

A Geiger-Mueller tube-based radiation measurement device includes circuitry for the correction of the dead time losses associated with the Geiger-Mueller tube. As the event count rate rises, the transfer function (e.g., the closed loop voltage gain) of an operational amplifier responding to an event count rate signal is modified to compensate for dead time losses experienced at high count rates. Preferably, an analog switch controlled by the event count rate signal automatically sets the voltage gain of the operational amplifier at a level corresponding to the desired amount of dead time compensation required to provide an accurate measurement of actual events. The dead time correction circuitry disclosed herein finds practical application in the use of well-known analog rate meter circuits of the charge pump type.

8 Claims, 1 Drawing Figure

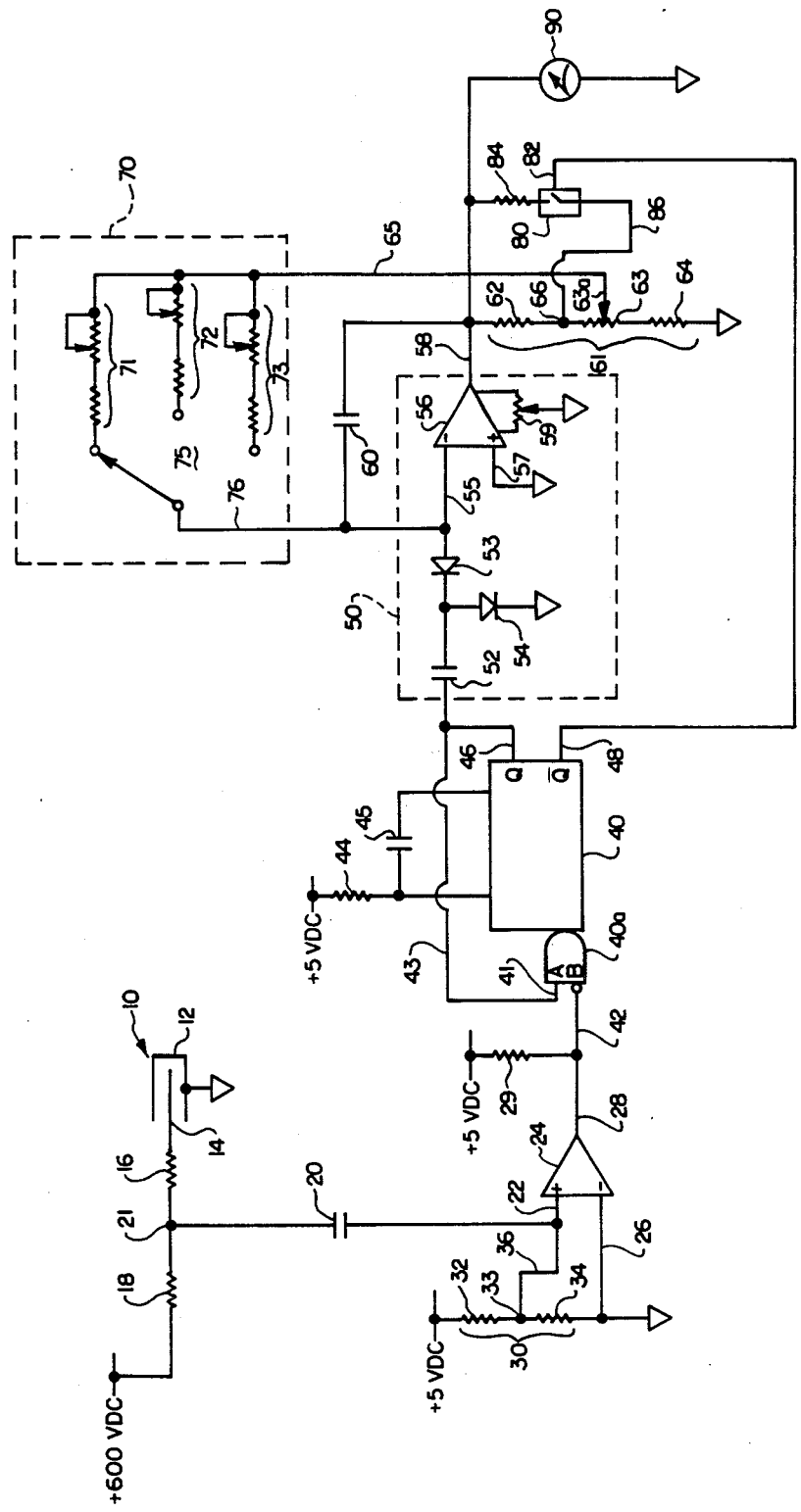

DEAD TIME COMPENSATION CIRCUIT FOR RADIATION DETECTOR

BACKGROUND OF THE INVENTION

The invention relates in general to means for correcting dead time losses in a random event counter circuit having a dead time characteristic. More particularly, the present invention relates to a Geiger-Mueller tube-based analog rate meter circuit of the charge pump type having correction means for compensation of Geiger-Mueller tube dead time losses experienced primarily at high count rates.

It is recognized that currently available Geiger-Mueller tubes are not 100% efficient, i.e., a Geiger-Mueller tube, even if assumed to be without a dead time characteristic, cannot provide an output pulse for each and every detectable atomic particle impinging on it. However, for purposes of the following discussion, it will be assumed that a Geiger-Mueller tube or other random event detecting transducer is 100% efficient but for any dead time losses. Thus, the following teachings with regard to the present invention apply regardless of transducer efficiency where the random event detecting transducer and/or its associated circuitry exhibits a dead time characteristic as discussed below.

Ideally, a Geiger-Mueller tube, or other transducer for detecting random events, should provide an output signal, such as a pulse, for each atomic particle emission (ionizing radiation) or other detectable random event to which it is exposed. In such an ideal case, the number of output signals, e.g., pulses, from the transducer would correspond in one-to-one relationship (i.e., a linear, directly proportional manner) to the number of detected atomic particles or other detectable random events impinging on the transducer.

It is recognized by those skilled in the art that such an idealized case cannot occur in practice, since the recovery time of the transducer (e.g., a Geiger-Mueller tube) has a limiting effect on its ability to respond to each and every detectable random event that it is exposed to regardless of the brevity of the time period separating successive random events. In the case of a Geiger-Mueller tube, for example, the recovery time (or non-responsive "dead time") of the tube and its associated detector circuitry can be greater than the time period during which two or more detectable (i.e., ionizing) atomic particles (e.g., gamma, alpha, or beta particles) impinge on the tube. In such a case, the tube will generate an erroneous output signal (e.g., a single pulse) indicative of a single particle detection when in fact the tube has been exposed to two or more detectable atomic particles. It is further recognized by those skilled in the art that the occurrence of such erroneous output signals (dead time losses) increases as the frequency of the randomly emitted ionizing atomic particles impinging on the Geiger-Mueller tube increases. Thus, the Geiger-Mueller tube and associated detector circuitry responds in a non-linear manner to the increasing frequency of detectable atomic particle emissions to which it is exposed. Therefore, the count rate measured by the detector circuitry will not accurately indicate the actual count rate of the random event unless some form of correction is provided to compensate for dead time losses. An example of a Geiger-Mueller-tube-based radiation detector not incorporating means for dead time compensation is a Model E-520 radiation detector manufactured and sold by Eberline Instrument Corp., a division of Thermo Electron Corp., Sante Fe, N. Mex. It is an object of the present invention to improve over such prior art detectors.

A more detailed explanation and analysis of dead time loss problems inherent in radiation detectors may be found on pages 95–102 of the text entitled "Radiation Detection and Measurement," authored by Glenn F. Knoll and published by John Wiley & Sons. Such text portion is incorporated by reference herein in its entirety.

U.S. Pat. No. 4,311,909 to Utting et al proposes a technique for dead time loss compensating in a Geiger-Mueller tube-based analog rate meter circuit of the charge pump type. In accordance with Utting et al, a dead time compensating analog switch, opening and closing in response to each event count signal from associated Geiger-Mueller tube-band circuitry, controls the discharge of an integrating capacitor associated with an operational amplifier whose output drives an analog meter intended to accurately indicate the actual rate of events occurring, i.e., the number of detectable atomic particles per unit of time inpinging on the associated Geiger-Mueller tube. If the dead time loss correction circuit requirements set forth by Utting et al are met, Utting et al conclude that their analog rate meter will provide an accurate reading corresponding to the true event count rate. It is implied by utting et al that their rate meter will respond accurately in a linear manner to increases and decreases in the actual event count rate, since such a result is the expected goal of dead time loss compensation. However, it has been found that a Model 400 radiation detector, manufactured and sold by Victoreen Incorporated, a division of Sheller-Globe Inc. of Toledo, Ohio, and purported to be made in accordance with the teachings of Utting et al U.S. Pat. No. 4,311,909, responds in a non-linear manner to actual event count rate increases and decreases, thus necessitating the need for a non-linear meter scale on the face of the meter that is believed to be calibrated empirically, i.e., by experiment, in an attempt to provide accurate results. Some skilled in the art would find the need to empirically calibrate the Utting et al non-linear meter scale to be unacceptable. Further, even if the need to empirically calibrate the Utting et al meter scale is acceptable, the resultant non-linear meter scale may lead to inadvertent misreading by an end user accustomed to reading linear scale readouts.

It is a general goal of the present invention to provide a technique for dead time loss compensation wherein the output of a random event counter incorporating such technique of dead time loss compensation responds in a linear or near linear manner to increases and decreases in the frequency of actual random events being counted as a function of time. It is a specific goal of the present invention to provide a dead time loss compensation circuit for a Geiger-Mueller tube-based analog rate meter circuit of the charge pump type wherein the output of the rate meter circuit responds in a linear or near linear manner to increases and decreases in the actual number of atomic particles per unit time to which the Geiger-Mueller tube is exposed.

SUMMARY OF THE INVENTION

A dead time compensation circuit is provided for a random event counter circuit having a dead time characteristic wherein two or more successive random events during a predetermined period of time erronе- ously generate a signal indicative of only a single count, the occurrence of such erroneous single count signals increasing as the frequency of the random events increases. The random event counter circuit includes an active circuit element, e.g., an operational amplifier, having an input responding to event count signals including as a portion thereof said erroneous single count signals. The active circuit element further includes an output providing a signal having a value intended to indicate the actual rate of the random events.

The dead time compensation circuit comprises means for detecting the frequency of the event count signals and means responsive to the detecting means for modifying a transfer function of the active circuit element, e.g., the closed loop voltage gain of the above-noted operational amplifier, as a function of the frequency of the event count signals, the value of the output signal from the active circuit element generally linearly increasing and decreasing in proportion to the actual number of random events per unit of time regardless of the proportion of said event count signals constituted by the erroneous single count signals resulting from dead time losses.

BRIEF DESCRIPTION OF THE DRAWING

A fuller understanding of the invention may be had by referring to the following description and claims taken in conjunction with the accompanying drawing, wherein a schematic diagram illustrates a Geiger-Mueller tube-based analog rate meter circuit incorporating a preferred embodiment of dead time loss compensation circuitry in accordance with the present invention.

DETAILED DESCRIPTION OF THE PREFERRED EMBODIMENT

With reference to the drawing, a random event counter circuit is disclosed, which includes as a portion thereof a dead time compensation means in accordance with the present invention. As will become evident from the following, the counter circuit illustrated in the drawing has a dead time characteristic wherein two or more successive random events during a predetermined period of time will erroneously generate a signal indicative of only a single event count. As noted earlier, it is well known to those skilled in the art that the occurrence of such erroneous single count signals increases as the frequency of the random events increases; hence the portion of erroneous single count signals included as a part of all event count signals increases as the frequency of detected random events increases. Thus, the purpose of the dead time compensation means to be subsequently discussed is to correct the response of the event counter circuit so as to compensate for the erroneous single count signals that occur primarily at high count rates.

The circuit in the drawing includes a random event detecting transducer in the illustrated form of a Geiger-Mueller tube 10 of the self-quenching type. A Geiger-Mueller tube used successfully in practicing the present invention is manufactured by TGM Detectors, Inc., of Waltham, Massachusetts, and referred to as a Model No. N117. This type of tube is primarily sensitive to gamma radiation in particular, but it is to be noted that other types of Geiger-Mueller tubes sensitive primarily to ionizing beta and alpha particles, for example, could also be utilized, depending upon the desired application of the random event counter. The Geiger-Mueller tube 10 includes a cathode portion 12 electrically connected to the neutral or ground point of the circuit, as illustrated. The tube 10 also includes an anode portion 14 spaced from the cathode portion 12, as illustrated, the space between the anode portion 14 and cathode portion 12 being filled by a radiation ionizable gas. The anode portion 14 is connected to one end of a quench-assisting resistor 16 (a requirement for the specified Model N117 Geiger-Mueller tube) having its other end connected to one end of a load resistor 18 whose other end is connected to a suitable high voltage power supply. As illustrated in the drawings, a +600-volt DC power supply for the above specified Geiger-Mueller tube 10 is utilized.

A coupling capacitor 20 has one of its ends connected to the interconnection node 21 of the quench-assisting resistor 16 and the load resistor 18 as illustrated. The other end of the coupling capacitor 20 is connected to the non-inverting input 22 of a voltage comparator 24. A low power, bipolar type 3302 voltage comparator manufactured by Motorola Semiconductor Products, Inc., of Austin, Tex., has been successfully used in the practice of the present invention. The inverting input 26 of the voltage comparator 24 is electrically connected to the neutral or grounding point of the circuit, as illustrated.

A first voltage divider network 30 is comprised of a first threshold determining resistor 32 connected in series with a second threshold determining resistor 34, one end of the network 30 being connected to a suitable low voltage power supply, such as a +5-volt DC power supply, as illustrated, the other end of the network 30, like the inverting input 26 of the voltage comparator 24, being connected to the electrical neutral or grounding point of the circuit. The interconnection node 33 of the network 30 is connected to the non-inverting input 22 of the comparator 24 by a threshold voltage providing line 36. The output 28 of the voltage comparator 24 is connected to one end of a pull-up resistor 29 having its other end connected to the +5-volt DC power supply, as illustrated. As will be recognized by those skilled in the art, the pull-up resistor 29 may or may not be needed for successful operation of the comparator 24, depending upon the particular comparator type utilized. In the present case, the specified Model 3302 voltage comparator utilized does require a suitable pull-up resistor.

The circuit illustrated in the drawing further includes a Type 14538 monostable or one-shot multivibrator 40, manufactured by Motorola Semiconductor Products, Inc., of Austin, Tex. The multivibrator 40 includes as an integral portion thereof a gate 40a having a positive trigger input 41 and a negative trigger input 42, the negative trigger input 42 being connected to the output 28 of the voltage comparator 24, as illustrated. As is well known in the art, the monostable or one-shot multivibrator 40, when triggered, will switch from a quiescent state to a trigger state and remain in the trigger state for a fixed time period and then return to its quiescent state. This fixed time period is determined by a time duration determining resistor 44 and a time duration determining capacitor 45 (i.e., the time duration of the triggered state of multivibrator 40 is equal to the product of the value of resistor 44 times the value of capacitor 45), one end of the resistor 44 being connected to the +5-volt DC power supply, the other end of the resistor being connected to the appropriate input pin of the multivibrator 40 and to one end of the capacitor 45 whose other end is connected to the appropriate input pin of the multivibrator 40. The multivibrator 40 includes a Q output provided on Q output line 46 and a complementary $\overline{Q}$ output provided on a $\overline{Q}$ output line 48. It will be recognized by those skilled in the art that when the Q output line 46 is in a low condition, or logic zero condition, the $\overline{Q}$ output line 48 will be in a high, or logic 1, condition, and vice versa. A retriggering inhibit line 43 connects the Q output line 46 to the positive trigger input 41 of the integral gate 40a, for purposes to be subsequently discussed.

The Q output line 46 provides an input signal to a conventional charge pump rate meter circuit 50 which includes a charging capacitor 52, a charging diode 54, a discharging diode 53, and an operational amplifier 56. A Type 3160 operational amplifier manufactured by RCA Inc., Solid State Division, Somerville, N.J., has been successfully used in practicing the present invention. More particularly, the Q output line 46 is connected to one end of the charging capacitor 52 having its other end connected to both the anode of the charging diode 54 and the cathode of the discharging diode 53, the cathode end of the charging diode being connected to the neutral or ground of the circuit, as illustrated. The anode of the discharging diode 53 is connected to the inverting input 55 of the operational amplifier 56 constituting an active circuit element means, while its non-inverting input 57 is connected to the neutral or ground point of the circuit. A suitable offset nulling resistor 59 of a potentiometer type is connected as illustrated to the appropriate pins of the operational amplifier 56 utilized, and to the neutral or ground point of the circuit.

As recognized by those skilled in the art, the frequency of the pulses provided on the Q output line 46 to the rate meter circuit 50 determine the value of a DC voltage provided on the output line 58 of the operational amplifier 56, the closed loop voltage gain (a transfer function) of the amplifier 56 being determined by a second voltage divider network 61 connected between the output line 58 and the neutral or ground point of the circuit. A conventional feedback type filtering or integrating capacitor 60 is connected between an input 55 and the output 58 of the operational amplifier 56. In the preferred embodiment, the second voltage divider network 61 includes a first resistor 62 having one of its ends connected to the output line 58, its other end being connected, as illustrated, to an end of a second resistor 63 of the potentiometer type, its other end being connected to one end of a third resistor 64, whose other end is connected to the neutral or ground point of the circuit. The voltage determined by the variable resistance leg 63a of the potentiometer 53 is applied via line 65 to a conventional current gain determining, meter scaling or ranging network 70. The scaling network 70 includes, for example, first, second, and third multiplying factor resistor sections 71, 72, 73, and a three-position, single-pole switch 75 having a common switch pole 76 which connects the network 70 to the inverting input 55 of the operational amplifier 56. It is to be noted, and will be readily recognized by those skilled in the art, that the meter scaling network 70 provides conventional means for changing the range of the analog rate meter circuit 50. The network 70 could be replaced by a single resistor where only a single range of readings on the meter 90 is desired. In such a case, line 65 would be connected via the single resistor to the inverting input 55 of the operational amplifier 56.

In accordance with the present invention, a closed loop voltage gain varying resistor 84 functions as a dead time compensation circuit element so as to vary the voltage gain of the operational amplifier 56 as a function of the frequency and duration (i.e., duty cycle) of the pulses provided by the $\overline{Q}$ output line 48. One end of resistor 84 is connected to the output line 58 of the operational amplifier 56, the other end of the resistor 84 being connected to the input of an analog switch 80 whose output is connected to the interconnection node 66 of resistors 62 and 63 via line 86, as illustrated. The turning on and off of the analog switch 80 is determined by the logic condition provided on an analog switch control input line 82 which is connected, as illustrated, to the $\overline{Q}$ output line 48. Thus, when the $\overline{Q}$ output line 48 is "high," switch 80 will be closed. Conversely, when the $\overline{Q}$ output line 48 is "low," switch 80 will be open to provide a higher voltage gain for the operational amplifier circuit.

It can be seen that when the analog switch 80 is in a closed condition, resistors 84 and 62 are connected in parallel so as to lower the effective resistance between node points 66 and output line 58. It will be appreciated by those skilled in the art that the duty cycle or period of time during which switch 80 is closed will determine the closed loop voltage gain of the operational amplifier circuit.

A more detailed explanation as to the operation of the illustrated circuit will now be given. As is well known in the art, in the case of the preferred embodiment illustrated, a gamma photon will cause ionization of the gas between the anode 14 and the cathode 12 of the Geiger-Mueller tube 10, wherein a negative pulse signal provided by the load resistor 18 will be transmitted via the coupling capacitor 20 to the non-inverting input 22 of the comparator 24. The network 30 associated with the voltage comparator 24 sets a threshold voltage which the pulses transmitted to the input 22 via capacitor 20 must exceed to provide a corresponding logic level pulse on output line 28 of the comparator 24. In effect, the network 30, in association with the comparator 24, functions as a noise filter to preclude the generation of false pulses on output line 28 that would not be indicative of or caused by the occurrence of an ionizing random event detected at the Geiger-Mueller tube 10. It is also well recognized in the art that the Geiger-Mueller tube 10, after providing a gamma photon indicative pulse through the capacitor 20, needs a predetermined amount of time to recover so as to be able to provide another pulse when another gamma photon strikes the tube or impinges upon the tube 10. This recovery time, plus the time of pulse signal generation by the tube, constitutes the dead time of the Geiger-Mueller tube 10. The dead time of the specified tube is approximately 50 microseconds. Since the generation of gamma photons and other atomic particles constitutes truly random events, a situation can occur wherein two or more gamma photons are generated in rapid succession over a time period less than the dead time period of the tube 10. Under such conditions, a single pulse signal passing through coupling capacitor 20 to the voltage comparator 24 may in fact be indicative of two or more gamma photons impinging on the Geiger-Mueller tube 10. The erroneous single count signal, i.e., the single pulse passing through the coupling capacitor 20 that is in fact generated by two or more rapidly successive gamma photons impinging on the tube 10, constitutes a greater portion of the overall signals passing through capacitor 20 as the frequency of gamma photons impinging on the tube 10 increases. Thus, the logic level pulses provided at the output 28 of the voltage comparator 24 include as a portion thereof erroneous single count signal or pulses, such proportion being dependent upon the frequency of the impinging ionizing particles, i.e., gamma photons, on the tube 10. At relatively low count rates, the number of erroneous single count pulses at output 28 is relatively low, while at a high count rate, the number of erroneous single count pulses generated on the output on line 28 is high. All of the pulses, including the erroneous single count pulses provided at the comparator output 28, are inputted to the monostable multivibrator 40, the retriggering inhibit line 43 functioning in a conventional manner to ensure that the monostable multivibrator 40 cannot be retriggered by a pulse on line 28 that is applied to negative trigger input 42 when the flip-flop 40 is in its triggered state. In the illustrated circuit, the fixed time period that the monostable multivibrator is in its triggered state is less than the dead time of the Geiger-Mueller tube 10, although this is not necessarily a requirement to practice this invention, since the teachings of the invention would still apply where additional dead time losses caused by the time period of the multivibrator being greater than the dead time of the Geiger-Mueller tubes occurred.

When the monostable multivibrator 40 switches from its quiescent state to its triggered state upon the occurrence of an input pulse provided on line 28, the Q output line 46 and the $\overline{Q}$ output line 48 change logic states and remain in the changed state until the monostable multivibrator 40 returns to its quiescent state, such fixed time period constituting the triggered state being determined by the resistor 44 and the capacitor 45, as discussed earlier.

When the monostable multivibrator 40 is in its triggered state, the $\overline{Q}$ output line 48 holds the analog switch 80 in an open condition, as illustrated, while the Q output line 46 causes full charging of the capacitor 52 via diode 54. When the monostable multivibrator 40 returns to its quiescent state, analog switch 80 closes so as to connect resistor 84 in parallel relation with resistor 62 so as to effect the closed loop voltage gain of the operational amplifier 56 driving the meter 90. It can be seen that as the frequency of switching of the monostable multivibrator increases, the current resulting from the discharge of capacitor 52 through diode 53 increases so as to increase the DC voltage on line 58 to the operational amplifier 56 wherein the meter 90 will indicate an increase in the count rate. It can also be seen that the proportion of time, i.e., the duty cycle, that the analog switch 80 is opened will increase as the pulse input to the rate meter circuit 50 increases. Thus, the closed loop voltage gain of the amplifier 56 becomes non-linear, i.e., the voltage gain of the amplifier 56 is higher at high count rates than at low count rates so as to compensate for the dead time losses associated with the Geiger-Mueller tube 10. In effect, the resistor 84 and the analog switch 80 function as means responsive to the random event count pulse rate for modifying the transfer function, i.e., the gain, of the active circuit element, i.e., the operational amplifier 56, as a function of the frequency of the event count signal. Thus, the DC voltage at the output 58 of the operational amplifier 56 applied to the meter 90 generally linearly increases and decreases in proportion to the actual number of random events per unit of time occurring at the Geiger-Mueller tube regardless of the proportion of the event count signals constituted by the erroneous signal count signals included as a portion thereof.

It can be seen that by making the operational amplifier circuit respond in a non-linear manner (determined by the selected values of components 44, 45, 62, 63, 64 and 84) as a function of the frequency of the pulses inputted to it via line 46, the meter 90 can be made to indicate the actual frequency of events occurring at the Geiger-Mueller tube 10 as opposed to the frequency of the pulses on line 46, i.e., the gain of the amplifier 56 is adjusted to reflect the need for the increased dead time compensation losses experienced at high frequency counts.

It is to be noted that the position of the switch 75 determines the scaling of the meter 90. For example, with the switch in the illustrated position, the meter face will indicate a 1:1 correspondence between the count rate indicated on the meter and the count rate of the events actually impinging on the Geiger-Mueller tube 10. When the switch 75 is moved to its midposition, the reading on the scale 90 would, for example, be multiplied by 10, whereas moving the switch 75 to its lowest position would require that the reading on the meter be multiplied by 100.

It is to be recognized that the meter 90 could be replaced by a digital-type voltmeter. It is also to be noted that the operational amplifier 56, while constituting an active circuit element means, could be replaced with other components by a microprocessor-type system which would, as an active circuit element means, respond in accordance with the invention. That is, the transfer function of the circuitry between the meter 90 and the Geiger-Mueller tube 10 would change so as to cause such circuitry to respond in a non-linear manner as a function of the frequency of event counts so as to compensate for any dead time losses in the circuitry.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. In a rate meter type random event counter circuit having a dead time characteristic wherein two or more successive random events during a predetermined period of time erroneously generate an event count signal indicative of only a single count, the occurrence of such erroneous single count signals increasing as the frequency of the random events increases, the random event counter circuit including active circuit element means having an input responding to event count signals including as a portion thereof said erroneous single count signals, and an output providing a signal having a value intended to indicate the actual rate of the random events, a dead time compensation circuit comprising:

means for detecting the frequency of said event count signals; and means responsive to the detecting means for non-linearly modifying a transfer function of the active circuit element means as a direct function of the frequency of the event count signals so that the said value of the output signal from the circuit element means increases and decreases in substantially linear proportion to the actual number of random events per unit of time regardless of the proportion of said event count signals constituted by said erroneous single count signals.

2. A dead time compensation circuit according to claim 1, wherein said circuit element means is an amplifier responding to said event count signals in a non-linear manner as the frequency of event count signals increases, the gain of the amplifier being greater at higher event count frequencies than at lower event count frequencies.

3. In a rate meter type random event counter circuit having a dead time characteristic wherein two or more successive random events during a predetermined period of dead time erroneously generate an event count signal indicative of only a single count, the occurrence of such erroneous single count signals increasing as the frequency of the random events increases, the random event counter circuit including operational amplifier circuit means having a closed loop voltage gain, and having an input responding to event count signals including as a portion thereof said erroneous single count signals, and an output providing a signal having a value intended to indicate the actual rate of random events, a dead time compensation circuit comprising:

means for detecting the frequency of the event count signals; and means responsive to the detecting means for non-linearly varying the closed loop voltage gain of the operational amplifier as a direct function of the frequency of the event count signals so that the said value of the output signal from the operational amplifier increases and decreases substantially linear in proportion to the actual number of random events per unit of time regardless of the proportion of said event count signals constituted by said erroneous single count signals.

4. A dead time compensation circuit according to claim 3, wherein said means for detecting the frequency of the event count signals includes a normally conducting analog switch switched to a non-conducting condition for a fixed time period for each signal constituting said event count signals, said compensation circuit further including a closed loop voltage gain compensation circuit element connected, via said analog switch, to a voltage gain determining portion of said operational amplifier circuit means only when said analog switch is in said conducting condition, wherein the gain of said operational amplifier circuit means is dependent on the duty cycle of the analog switch.

5. A dead time compensation circuit according to claim 4, wherein said voltage gain determining portion of said operational amplifier circuit means is constituted by a resistor network connected to the operational amplifier, the effective resistance of said network being determined by the duty cycle of said analog switch.

6. A dead time compensation circuit according to claim 4, wherein said gain compensation circuit element is a resistor, said operational amplifier circuit means having an associated gain determining resistor, said resistor being connected in parallel relation with the gain determining resistor of said operational amplifier circuit means only when said analog switch is in a conducting condition.

7. A dead time compensation circuit according to claim 4, including a monostable multivibrator, the fixed time period during which said analog switch does not conduct being determined by the monostable multivibrator triggered by each of said event count signals.

8. A dead time compensation circuit according to claim 7, wherein said fixed time period is less than said predetermined period of dead time.

* * * * *